July 26, 1949.  R. A. BRADEN  2,477,475
ADJUSTABLE COUPLING TRANSFORMER
Filed April 1, 1949
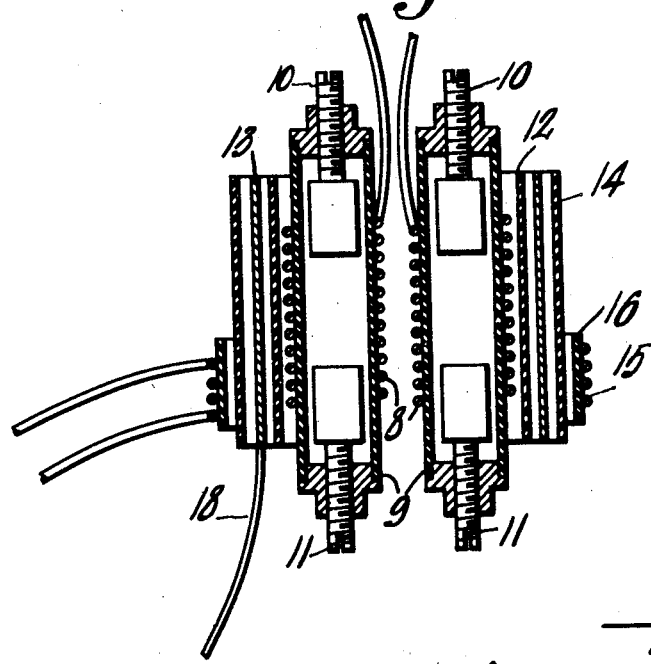
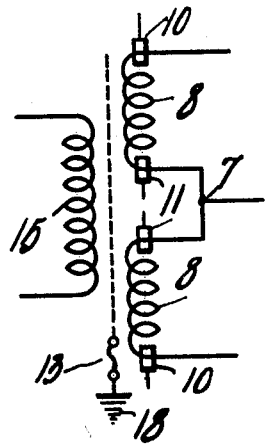
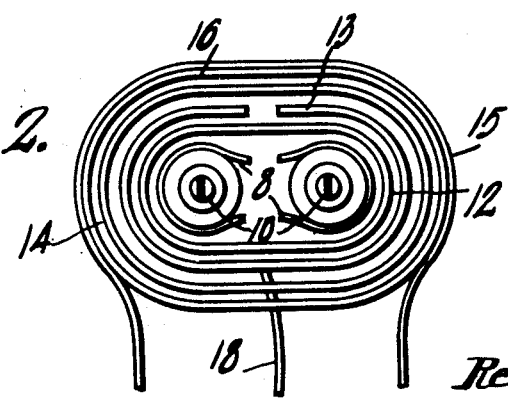
INVENTOR
René A. Braden
BY
Conder C. Henry
ATTORNEY Patented July 26, 1949

2,477,475

UNITED STATES PATENT OFFICE 2,477,475

ADJUSTABLE COUPLING TRANSFORMER

René A. Braden, Hopewell, N. J., assignor to Radio Corporation of America, a corporation of Delaware Application April 1, 1949, Serial No. 84,905

10 Claims. (Cl. 171—119)

The present invention relates to a coupling system, and more particularly to a novel and improved coupling transformer, one use of which is fully described in my application No. 718,915 (Radar system of superheterodyne FM type), filed December 28, 1946, in which there is described a frequency modulation radar system in which the received signal is converted to an intermediate frequency in a superheterodyne receiver. Following amplification in an intermediate frequency amplifier, the signal modulation which is characteristic of the distance of the object from which the received signal was reflected must be selected out and separated from the intermediate frequency carrier. This is accomplished by heterodyning the modulated carrier against an unmodulated radio frequency current of the same frequency, thus converting the signal from a carrier frequency of, for example, 30 megacycles per second, to zero carrier frequency. This last frequency conversion is preferably accomplished in a converter having a balanced input coupling circuit, by virtue of which any noise currents which may accompany the "unmodulated" beating current (either as modulation sidebands or as independent currents) will be balanced out or neutralized, and therefore will not be passed on to the output circuit. The input coupling transformer is required to be balanced to a high degree of accuracy over the whole frequency band occupied by the modulated intermediate frequency signal, in order that interfering noise currents may be eliminated from the signal output circuit. This degree of balance is difficult to obtain with the usual radio frequency transformer constructions as exemplified in the well known discriminator-rectifier circuit of the type disclosed by S. W. Seeley in U. S. Patent No. 2,121,103, granted June 21, 1938, which employs a center-tapped secondary coil for the input transformer of the opposed signal rectifiers. Those skilled in the art know that, hitherto, the center-tapped secondary coil has been disadvantageous to the employment of inductance tuning by a relatively moveable core, because, since only one core is used, when it enters one end of the secondary coil, it causes the inductances of the two halves of the secondary to be unequal. Furthermore, for the same reason, the voltages induced in the two halves of the secondary are also unequal. These results are undesirable in all frequency discriminator circuits where symmetry between primary and secondary circuits is required.

It is an object of my invention to produce a transformer which is capable of a high degree of balance in the voltages induced in separate secondary coils.

A further object of my invention is to provide efficient coupling at any particular frequency over a range of frequencies.

A more specific object of my invention is to provide a novel arrangement of a coupling transformer having tuning plugs or trimmers individually adjusted so that the primary and secondary circuits are tuned to an operating frequency and having a high degree of accuracy in the balance of voltages in the separate secondary sections.

It is an additional object of my invention to provide means whereby the degree of coupling between two circuits or networks may be varied without substantially influencing the effective inductance of the circuits with which it is employed.

In accordance with my invention, the foregoing objects are attained by providing a transformer comprising two secondary coils each having two movable plugs, one being a coupling adjusting plug and the other being a tuning plug, a primary coil inclosing both secondary coils and normally positioned nearer the coupling adjusting plugs than the tuning plugs, and an electrostatic shield placed between the primary and secondary coils.

My invention will best be understood by reference to the accompanying drawings, in which:

Figure 1 shows an elevation of one embodiment of the coupling means in accordance with my invention;

Figure 2 shows an end view of the same; and

Figure 3 is a schematic diagram of one arrangement of my invention.

Referring to Figure 1, two secondary coils, 8, are wound on insulating forms, 9; secondary tuning plugs, 10, are inserted in each of the secondary coils with coupling plugs, 11, inserted at the opposite ends. The two secondary coils are positioned parallel to each other and are covered with insulating material, 12. An electrostatic shield, 13, is positioned outside the insulating material and over such shield is placed additional insulating material, 14. The insulating material may be paper, Bakelite, mica, or any other material which is suitable for the purpose. The electrostatic shield may be constructed by cutting parallel slots in a restangular piece of thin metal foil, so as to form a set of narrow comb-like strips which are attached at one end to a common connecting strip. This slotted sheet is then wrapped around the coil assembly and is positioned and supported by the two insulating layers. A ground connection, 18, is attached to the connecting strip.

The primary coil, 15, is wound on an insulating form, 16, which surrounds the insulating layer, 14. The relative positions of the coils and the electrostatic shield are shown in Figure 2, which represents an end view of the transformer, omitting insulating members to clarify the illustration. It will be noted from Figure 1 that the primary coil is not centrally located with respect to the secondary coils but is near those ends of the secondary coils in which the coupling-adjustment plugs are operative. It is, furthermore, not fixed in position but is capable of being moved by sliding the part, 16, over the part 14, so as to adjust the amount of coupling between the primary coil and the secondary coils.

The electrostatic shield, placed between the primary coil and the secondary coils, serves the purpose of preventing electrostatic coupling between the coils but does not interfere with magnetic coupling. This action of an electrostatic shield is well known and will not be described further.

Referring to Figure 3 wherein the coils are shown connected as in use, it is to be understood that the coils are so wound and connected that the magnetic field surrounding the primary coil induces voltages which are oppositely directed in the two secondary coils, so that when the instantaneous voltage is positive at one extremity of the secondary circuit, it is negative at the other extremity.

The coupling plugs, 11, are normally so positioned as to be partly inside and partly outside the secondary coils, 8, in which position they are in the path of both the primary and secondary flux. The amount of primary flux that couples with the secondary coils is affected by the position of said coupling plugs. The adjustment which increases the coupling also increases the self-inductance of the secondary coils; however, this may be compensated for by means of the tuning plugs, 10, which are located in the ends of the secondary coils remote from the primary coil. In this position the tuning plugs, 10, are located, for all practical purposes, only in the field of the secondary flux. It is clear that each secondary coil may be coupled or tuned at will.

The tuning and the coupling adjustment plugs may be cylindrical pieces of compressed powdered iron of high magnetic permeability, or tubular cylinders of high-conductivity metal, or one set may be of one type and the other set of the other type.

The operation of a coil such as described above for use in circuits requiring a single ended input and a balanced double ended output will be clear from a consideration of the schematic diagram shown in Figure 3, wherein parts corresponding to Figure 1 have been similarly numbered. It will be clear that the major portion of the coupling flux is concentrated at the ends of the coils, 8, which are connected together, where the coupling plugs, 11, have maximum effect while little of the coupling flux appears at the other ends of the coils, 8, where the tuning plugs, 10, have the maximum effect. Thus it is possible to individually adjust the degree of coupling and resonance of each coil, 8, to provide a high degree of balance in the output circuit.

While the use of the electrostatic shield is desirable in securing perfection of operation of my invention, yet it will be understood that its use is not essential, since the device will operate without such a shield.

Obviously many modifications and variations of the present invention are possible in the light of the above teachings. For example, both the input and output may be balanced and double ended, or the input may be balanced and double ended and the output may be single ended. It is therefore to be understood that, within the scope of the appended claims, the invention may be practiced otherwise than is specifically described herein.

I claim:

1. A coupling transformer for obtaining a high degree of balance in induced voltages comprising a primary coil, two secondary coils arranged in parallel spaced relationship within said primary coil, and an inductance-changing plug in each end of each secondary coil.

2. A coupling device providing for adjustment to obtain a high degree of balance in induced voltages comprising two secondary coils arranged in parallel spaced relationship, a primary coil surrounding the said secondary coils, inductance-changing plug operative in each end of each secondary coil, and means for adjusting said plugs.

3. A coupling device comprising two secondary coils arranged in parallel spaced relationship, a primary coil surrounding the said secondary coils, an electrostatic shield placed between said primary coil and said secondary coils, and an adjustable inductance-changing plug positioned in each end of each secondary coil.

4. A coupling device for obtaining a high degree of balance in induced voltages comprising two secondary coils arranged in parallel spaced relationship; a primary coil surrounding said secondary coils and positioned nearer to one end of said secondary coils than the other; each of said secondary coils being provided with a tuning plug and a coupling plug, each of said tuning plugs being movably positioned in one end of said secondary coils for changing the tuning inductance of said secondary coils, and each of said coupling plugs being movably positioned in the other end of said secondary coils for controlling the degree of coupling between said primary coil and secondary coils.

5. A coupling device for obtaining a high degree of balance in induced voltages comprising two secondary coils arranged in parallel spaced relationship, a primary coil surrounding said secondary coils and positioned nearer to one end of said secondary coils than the other, each of said secondary coils being provided with a tuning plug and a coupling plug, each of said tuning plugs being movably positioned in the end of each of said secondary coils remote from said primary coil, and each of said coupling plugs being movably positioned in the end of each of said secondary coils near to said primary coil.

6. A coupling device for obtaining a high degree of balance in induced voltages comprising two secondary coils arranged in parallel spaced relationship, a primary coil surrounding said secondary coils and positioned nearer to one end of said secondary coils than the other, an electrostatic shield positioned between said primary coil and said secondary coils, each of said secondary coils being provided with a tuning plug and a coupling plug, each of said tuning plugs being movably positioned in one end of each of said secondary coils, and each of said coupling plugs being movably positioned in the other end of each of said secondary coils.

7. A coupling device for obtaining a high degree of balance in induced voltages comprising two secondary coils arranged in parallel spaced relationship, a primary coil surrounding said secondary coils and positioned nearer to one end of said secondary coils than the other, an electrostatic shield positioned between said primary coil and said secondary coils, each of said secondary coils being provided with a tuning plug and a coupling plug, each of said tuning plugs being movably positioned in the end of each of said secondary coils remote from said primary coil, and each of said coupling plugs being positioned in the end of each of said secondary coils near to said primary coil.

8. A coupling device for obtaining a high degree of balance in induced voltages comprising two secondary coils arranged in parallel spaced relationship, a primary coil surrounding said secondary coils, an electrostatic shield positioned between said primary coil and said secondary coils, each of said secondary coils being provided with a tuning plug and a coupling plug, each of said tuning plugs being movably positioned in one end of each of said secondary coils, and each of said coupling plugs being movably positioned in the other end of each of said secondary coils.

9. A coupling device for obtaining a high degree of balance in induced voltages comprising two series connected secondary coils arranged in parallel spaced relationship, a primary coil surrounding said secondary coils and positioned nearer to one end of said secondary coils than the other, a center tap on said series connected secondary coils, each of said tuning plugs being movably positioned in one end of each of the said secondary coils, and each of said coupling plugs being movably positioned in the other end of each of said secondary coils.

10. A coupling device for obtaining a high degree of balance in induced voltages comprising two secondary coils arranged in parallel spaced relationship, a primary coil surrounding said secondary coils and positioned nearer to one end of said secondary coils than the other, an electrostatic shield positioned between said primary coil and said secondary coils, each of said secondary coils being provided with a tuning plug and a coupling plug, each of said tuning plugs being movably positioned in the end of each of said secondary coils remote from said primary coil, and each of said coupling plugs being positioned in the end of each of said secondary coils near to said primary coil.

RENÉ A. BRADEN.

REFERENCES CITED

The following references are of record in the file of this patent:

UNITED STATES PATENTS

| Number | Name | Date |
| --- | --- | --- |
| 1,357,197 | Brooks | Oct. 26, 1920 |
| 1,777,256 | Daley et al. | Sept. 30, 1930 |
| 2,333,015 | Kramer et al. | Oct. 26, 1943 |